(12) United States Patent
Kitchens et al.

(10) Patent No.: US 9,150,126 B1
(45) Date of Patent: Oct. 6, 2015

(54) ANCHOR LATCH ASSEMBLY FOR CHILD RESTRAINT SYSTEM

(71) Applicants: Drew Kitchens, Acworth, GA (US); Daniel Brunick, Alpharetta, GA (US); Jake Mitchell, Atlanta, GA (US); William Conway, Marietta, GA (US)

(72) Inventors: Drew Kitchens, Acworth, GA (US); Daniel Brunick, Alpharetta, GA (US); Jake Mitchell, Atlanta, GA (US); William Conway, Marietta, GA (US)

(73) Assignee: Graco Children's Products Inc., Atlanta, GA (US)

( * ) Notice: Subject to any disclaimer, the term of this patent is extended or adjusted under 35 U.S.C. 154(b) by 0 days.

(21) Appl. No.: 14/143,640

(22) Filed: Dec. 30, 2013

Related U.S. Application Data

(60) Provisional application No. 61/747,933, filed on Dec. 31, 2012.

(51) Int. Cl.
   *B60N 2/28* (2006.01)
(52) U.S. Cl.
   CPC ............ *B60N 2/2806* (2013.01); *B60N 2/2857* (2013.01)
(58) Field of Classification Search
   CPC ..... B60N 2/2857; B60N 2/286; B60N 2/2863
   USPC .............................. 297/250.1, 256.14, 256.16
   See application file for complete search history.

(56) References Cited

U.S. PATENT DOCUMENTS

| | | | |
|---|---|---|---|
| 4,480,870 A * | 11/1984 | von Wimmersperg | 297/216.11 |
| 4,913,490 A * | 4/1990 | Takahashi et al. | 297/256.14 |
| 5,052,750 A * | 10/1991 | Takahashi et al. | 297/256.13 |
| 5,671,971 A | 9/1997 | Koyanagi et al. | |
| 5,695,243 A | 12/1997 | Anthony et al. | |
| 6,048,028 A * | 4/2000 | Bapst | 297/250.1 |
| 6,193,310 B1 | 2/2001 | Batalaris et al. | |
| 6,209,957 B1 | 4/2001 | Baloga et al. | |
| 6,450,576 B1 | 9/2002 | Rhein et al. | |
| 6,543,846 B2 | 4/2003 | Cone | |
| 6,592,183 B2 | 7/2003 | Kain | |
| 7,044,548 B2 | 5/2006 | Mullen et al. | |
| 7,168,762 B2 | 1/2007 | Maciejczyk | |
| 7,744,156 B2 * | 6/2010 | Chen et al. | 297/250.1 |
| 7,901,003 B2 | 3/2011 | Meeker et al. | |
| 8,313,142 B2 * | 11/2012 | Xiao | 297/256.16 |
| 8,328,281 B2 * | 12/2012 | Balensiefer et al. | 297/256.14 |
| 8,905,478 B2 * | 12/2014 | Strong | 297/256.14 |

FOREIGN PATENT DOCUMENTS

| | | |
|---|---|---|
| CN | 201287650 Y | 8/2009 |
| DE | 202009013518 U1 | 12/2010 |

* cited by examiner

*Primary Examiner* — Peter Brown
(74) *Attorney, Agent, or Firm* — Sutherland Asbill & Brennan LLP

(57) ABSTRACT

A child safety seat has a seat shell with a seat back portion, a seat bottom portion, and a seating surface. A track is provided on the child safety seat. A slot has a slot length along the track and a slot width defined between two parts of the track. An anchor strap has a belt, two anchoring connectors coupled to and spaced apart along the belt, and a central section between the two anchoring connectors. The central section has a thickness less than the slot width and captured in the slot between the two parts of the track. The two anchoring connectors are sized larger than the slot width thereby preventing removal of the anchor strap from the child safety seat. The anchor strap can slide along the slot length between at least a forward facing anchor position and a rear facing anchor position on the seat shell.

20 Claims, 10 Drawing Sheets

ANCHOR LATCH ASSEMBLY FOR CHILD RESTRAINT SYSTEM

RELATED APPLICATION DATA

This patent is related to and claims priority benefit of U.S. Provisional Application Ser. No. 61/747,933 filed Dec. 31, 2012 and entitled "Anchor Latch Assembly for Child Restraint System." The entire content of this prior filed provisional application is hereby incorporated herein by reference.

BACKGROUND

1. Field of the Disclosure

The present disclosure is generally directed to child restraint systems, and more particularly to an anchor latch assembly or arrangement configured to accommodate forward facing and rear facing seat installation orientations.

2. Description of Related Art

Many known child restraint systems (CRS), i.e., child vehicle safety seats or car seats, for infants and small children are designed to be installed in a vehicle in both a rear facing and a forward facing orientation. Vehicles are also now provided with dedicated or fixed seat anchors associated with the rear seat of the vehicle. In 2002, the National Highway Traffic Safety Administration (NHTSA) implemented rules regarding anchoring a child car seat in a vehicle. The rules are known as LATCH, which stands for lower anchors and tethers for children. Use of the LATCH system is a common restraint method of connecting a CRS to the vehicle seat. A CRS that can be installed in both a rear facing and a forward facing direction need to be capable of having the ability to use or arrange the LATCH components for both installation directions.

The typical LATCH system employs fixed anchors or anchor points mounted in a vehicle adjacent the vehicle's dedicated rear seat, either at the seat bight, at the top of the seat back, or both. The typical LATCH system also employs a strap or anchor belt connected to the CRS that connects to the anchors or anchor points. On seats that are capable of both forward and rear facing installations, the LATCH system often has two completely separate straps or anchor belts, one for each orientation. This is because the straps or anchor belts are now required by NHTSA rules to remain permanently connected to the CRS and the strap position on the seat required for the rear facing orientation is virtually always different than the strap position on the seat for the forward facing orientation. This solution requires duplicate LATCH assembly parts, which adds cost and complexity to the CRS.

Some manufacturers have attempted to address the issue of providing two different anchor belts or straps. For example, both Dorel and Evenflo use a "leash" type design. A leash strap is attached to the CRS seat. A single LATCH assembly or strap is coupled to the leash and thus to the CRS seat. The user is required to route the strap of the LATCH assembly through and/or along one of at least two optional belt paths designated for either a rear facing or forward facing installation, respectively. The leash only keeps the LATCH strap coupled to the CRS during use and storage. It is completely up to the user to find the proper belt path and to route the LATCH strap properly. Also, the user typically has to remove soft goods on the seat in order to find and utilize the desired belt path.

In another example, a Britax seat is known that uses two LATCH assemblies or straps, one on each side of the seat. The left hand side LATCH strap is slidably looped onto a rigid bar on the left side of the seat or CRS shell. The right hand side LATCH strap is slidably looped onto another rigid bar on the right side of the seat or CRS shell. The left hand and right hand LATCH straps each slide along their respective rigid bar to switch between the rear facing and forward facing belt path positions. This LATCH assembly requires two bars, one on each side of the CRS seat, and two straps, one for left hand side and one for right hand side usage. This solution also requires duplicate parts and adds cost, complexity and weight to the CRS.

SUMMARY

A child safety seat in one example according to the teachings of the invention has a seat shell with a seat back portion, a seat bottom portion, and a seating surface defined in part by a front facing side of the seat back portion and in part by a top facing side of the seat bottom portion. A track is provided on the child safety seat. A slot has a slot length along the track and a slot width defined between two parts of the track. An anchor strap has a belt, two anchoring connectors coupled to and spaced apart along the belt, and a central section of the belt between the two anchoring connectors. The central section has a thickness less than the slot width and is captured in the slot between the two parts of the track. The two anchoring connectors are sized larger than the slot width thereby preventing removal of the anchor strap from the child safety seat. The anchor strap can slide along the slot length between at least a forward facing anchor position and a rear facing anchor position on the seat shell.

In one example, the length of the belt between the two anchoring connectors can be adjustable by a user.

In one example, the track can include a bar that can be fastened to a side of the seat shell.

In one example, the track can include a surface on the seat shell. The surface can be an outside surface on a side panel of the seat shell.

In one example, the track can include a surface on the seat shell. The surface can be a portion of the seating surface of the seat shell.

In one example, the child safety seat can have a forward facing belt path on the seat shell associated with the forward facing anchor position and a rear facing belt path on the seat shell associated with the rear facing anchor position. The forward facing belt path and rear facing belt path can be spaced apart from one another on the seat shell.

In one example, the seat shell can have opposed side panels that protrude from opposite sides of the seating surface.

In one example, the seat shell can have one or more belt path openings formed in parts of the seat shell, such as in opposed side panels on the shell. The belt path openings can define in part the forward facing anchor position, the rear facing anchor position, or both.

In one example, the track can include a surface on the seat shell and the surface can be the seating surface. The track can also include a bar that can be attached to a portion of the seating surface of the seat shell.

In one example, the track can include a recess in the eating surface of the seat shell and the surface can be a surface of or within the recess in the seating surface. The track can include a bar that can be positioned within the recess and spaced from the surface.

In one example, the child safety seat can include a seat base to which the seat shell can be removably mounted. The track can be provided on the seat shell of the child safety seat.

In one example, the seat back portion and the seat bottom portion can be integrally formed together as a unit, which renders the seat shell a one-piece structure.

In one example, the seat back portion and the seat bottom portion can be formed as two separate structures that are attachable to and detachable from one another, which renders the seat shell a two-piece structure.

In one example according to the teachings of the present invention, a child restraint system has a seat shell with a seat back and a seat bottom. A track is disposed on the child restraint system and a slot is defined by the track on the child restraint system. The slot has a slot length along the track and has a slot width defined by a spacing between parts of the track. An anchor strap has a belt, two anchoring connectors coupled to the belt, and a central section of the belt between the two anchoring connectors. The central section is captured in the slot and the anchor strap is extendable across a width of the child restraint system. The anchor strap can slide along the length of the slot between at least two different anchoring positions on the child restraint system. The two anchoring connectors are sized larger than the slot width preventing removal of the anchor strap from the child restraint system.

In one example, the track can include a bar on a part of the child restraint system. The slot width can be defined between the bar and a surface of the child restraint system.

In one example, the track can include a bar attached to the seat shell. The slot width can be defined between the bar and a surface of the seat shell.

In one example, the track can include a bar attached to a side panel of the seat shell. The slot width can be defined between the bar and an outside surface of the side panel.

In one example, the seat shell can include a seating surface defined in part by a front facing side of the seat back and a top facing side of the seat bottom. The track can include a bar attached to a portion of the seating surface and the slot width can be defined between the bar and part of the seating surface.

In one example, the seat shell can include a seating surface defined in part by a front facing side of the seat back and a top facing side of the seat bottom. The track can include a recess in a portion of the seating surface and a bar attached to the seating surface adjacent the recess. The slot width can be defined between the bar and a surface of the recess.

In one example, the track can include a bar attached to the child restraint system. The bar can be curved or bent over at least a portion of a length of the bar.

In one example, a length of the central section of the belt can be adjustable between the anchoring connectors.

In one example, the child restraint system can include a forward facing belt path on the child restraint system associated with one of the at least two different anchoring positions and a rear facing belt path on the seat shell associated with the other of the at least two different anchoring positions. The forward facing belt path and the rear facing belt path can be spaced apart from one another on the child restraint system.

In one example, the seat shell can have opposed side panels that protrude from opposite sides of a seating surface of the seat shell.

In one example, the child restraint system can include one or more belt path openings formed in side panels of the seat shell. The belt path openings can define in part a forward facing anchor position, a rear facing anchor position, or both.

In one example, the track can be provided on an outside surface of a side panel on the seat shell.

In one example, the seat shell can have a seating surface defined in part by a front facing side of the seat back and a top facing side of the seat bottom. The track can be provided along a portion of the seating surface.

In one example, the child restraint system can also have a seat base and the seat shell can be removably attached to the seat base. In one example, the track can be disposed on the seat base.

BRIEF DESCRIPTION OF THE DRAWINGS

Objects, features, and advantages of the present invention will become apparent upon reading the following description in conjunction with the drawing figures, in which.

DETAILED DESCRIPTION OF THE DISCLOSURE

The disclosed child restraint system examples solve or improve upon one or more of the above-noted and/or other problems and disadvantages with prior known child restraint systems and child safety seats or car seats. The disclosed systems require only a single anchor strap. The disclosed systems require only a single bar to capture the single anchor strap. The disclosed systems allow the anchor strap to freely slide along the bar between anchoring positions on the child restraint system while capturing the anchor strap to the child restraint system. The spacing between the bar and a surface of the child restraint system is sized smaller than the size of the anchoring connectors carried on the anchor strap. This prevents the anchor strap being removed from the child restraint system. The child restraint system can be provided with elements that create belt routing paths for forward and rear facing seat orientations. The anchor strap can slide between the two belt paths and be routed accordingly without having to remove the anchor strap from the child restraint system. These and other objects features, and advantages of the disclosed child restraint system examples will become evident to those having ordinary skill in the art upon reading this disclosure.

Figure 1:
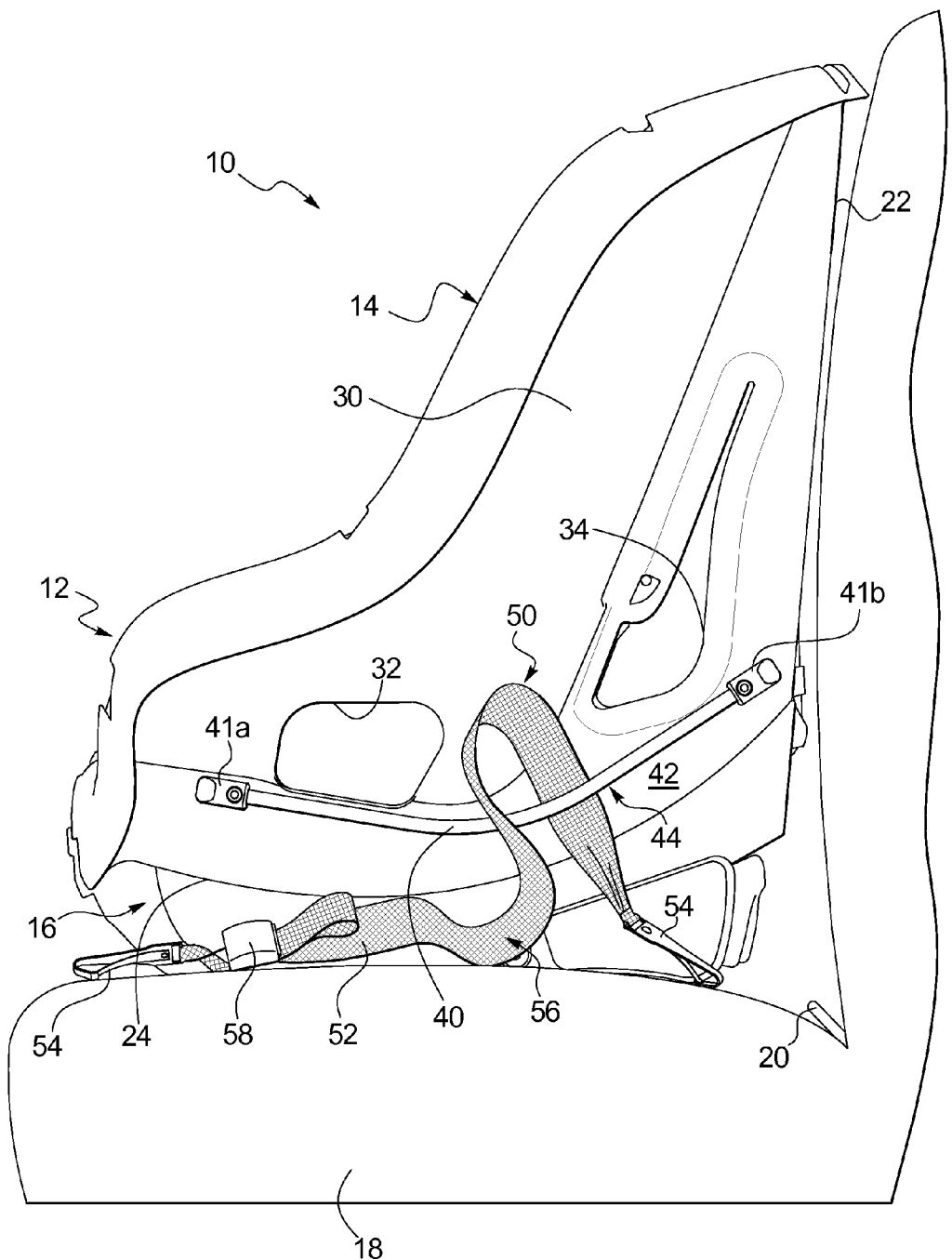
FIG. 1 shows a side view of one example of a child restraint system on a vehicle seat and constructed in accordance with the teachings of the present invention.

Turning now to the drawings, FIG. 1 shows one example of a child restraint system 10 constructed in accordance with the teachings of the present invention. In this example, the child restraint system 10 has a child safety seat 12 (i.e., a seat assembly) with a seat shell 14 and a seat base 16. As is known in the art, the seat shell 14 can be removably coupled or mounted to the seat base 16. In some systems, the recline angle of the seat shell is adjustable on the seat base 16. The child safety seat 12 or seat assembly can then be rested on a vehicle seat 18 for use. The vehicle seat 18 has fixed anchors or anchor points 20 as required by the LATCH rules noted above.

The terms seat, seat assembly, child seat, child safety seat, child restraint system, and the like are commonly known and used in practice, and often interchangeably. These terms as used herein should not be read as specifically limiting the invention in any way to a specific type of seat, seat construction, seat arrangement, seat configuration, seat component assembly, or the like. The limits on the scope of the disclosure should be determined by the scope of the claims, which are more directed to the anchoring components and methods disclosed and described herein, and not by the usage of such terms referring to the child restraint system seat components.

Figure 2A:
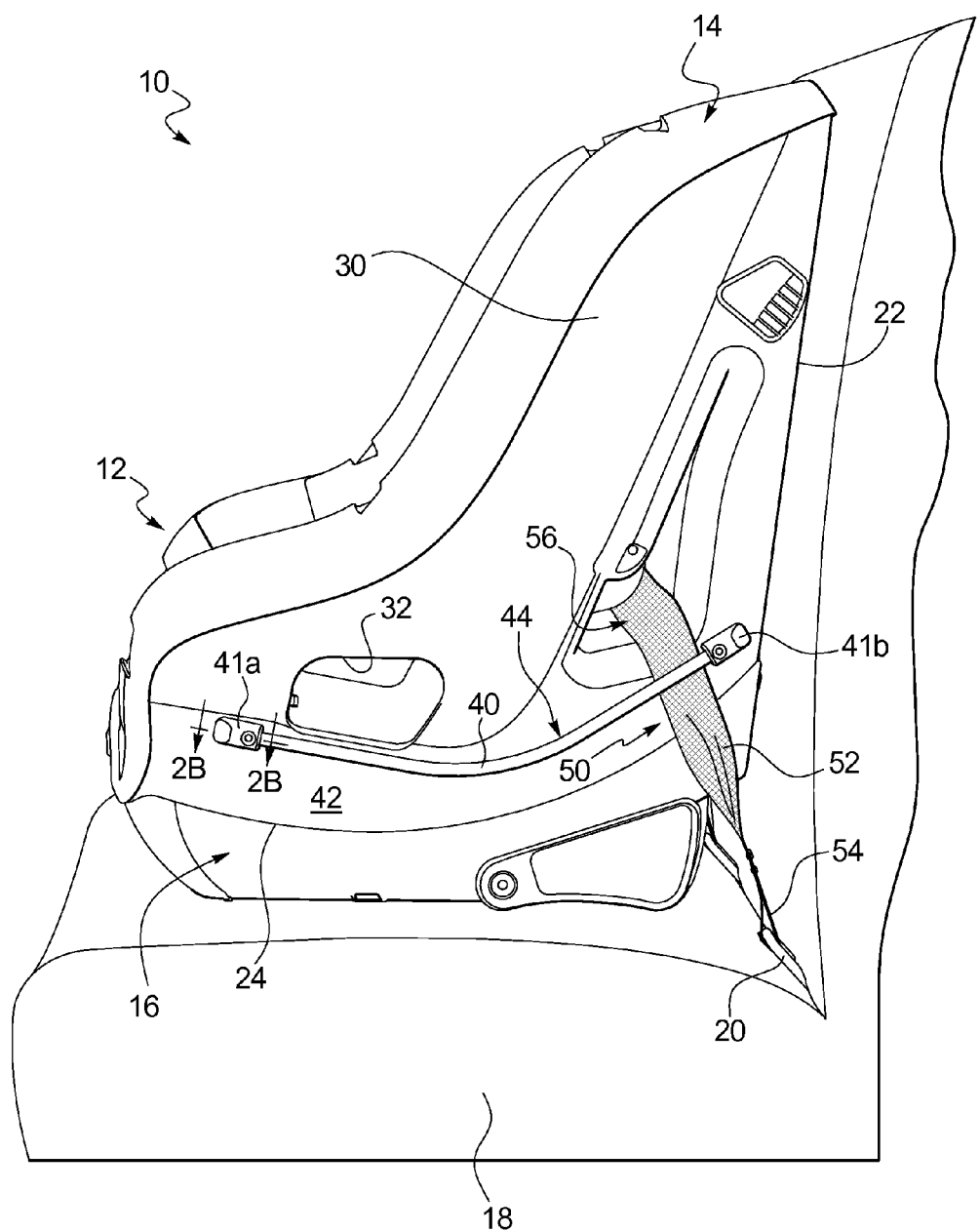
FIG. 2A shows the child restraint system of FIG. 1 anchored to the vehicle seat in a forward facing seat orientation and installation arrangement.
Figure 2B:
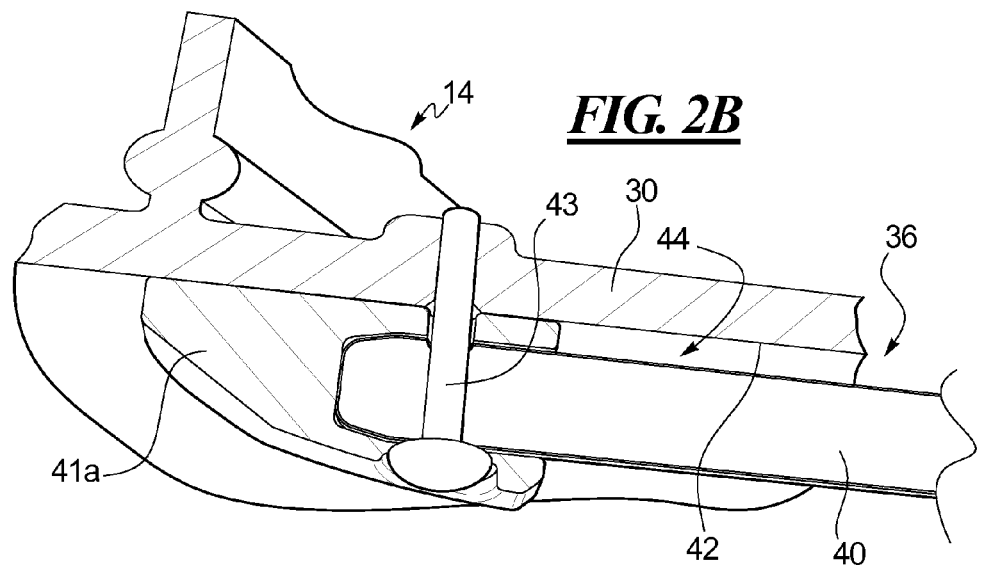
FIG. 2B shows a cross-section taken along line 2B-2B of a forward end of a track portion of the child restraint system shown in FIG. 2A.
Figure 2C:
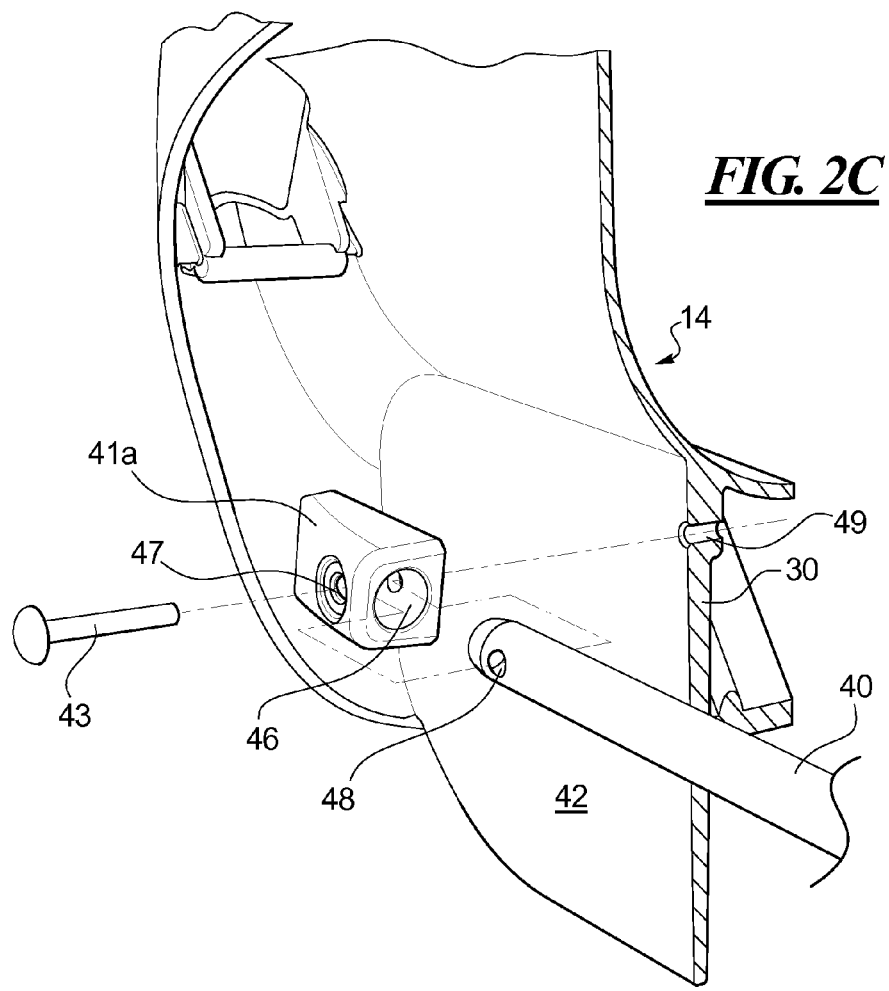
FIG. 2C shows an exploded perspective view of the forward end components for the track portion of the child restraint system depicted in FIG. 2B.
Figure 3:
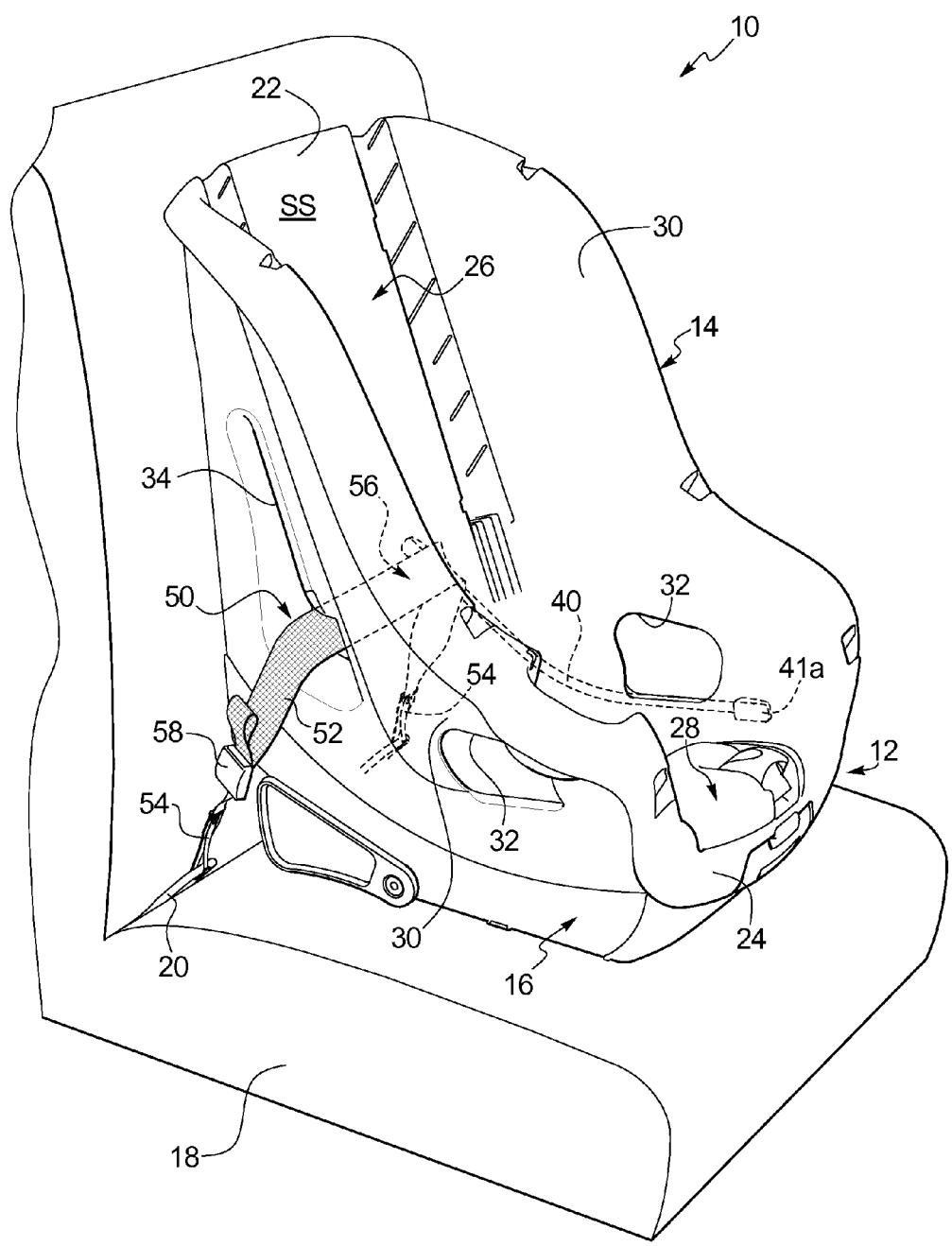
FIG. 3 shows a perspective view of the child restraint system in the forward facing seat orientation depicted in FIG. 2A.

As shown in FIGS. 1-3, the disclosed seat shell 14 has a seat back portion 22 and a seat bottom portion 24. The seat back and seat bottom portions 22, 24 of the seat shell 14 can be formed as an integral molded unitary structure, rendering a one-piece seat shell structure. Alternatively, the seat back and seat bottom portions, though not shown herein, can be provided as two separate parts attached to and detachable from one another. Such a seat base 16 is provided with many child restraint systems known in the art. In one example, not shown herein, the LATCH or anchoring components can be provided on the seat base and not the seat shell. However, it is within the scope of the present disclosure that the disclosed LATCH or anchoring methods and components can be used with or without the presence of the seat base. In still another example, the seat shell can be provided without a base and with the seat back and seat bottom provided as separate components rendering a two-piece seat shell construction. In such an example, all of the LATCH or anchoring components disclosed and described herein can be provided on the seat back portion only. When a child reaches a certain age and/or size, the seat back can be detached and discarded or stored, along with the LATCH or anchoring components. Only the seat bottom would then be used as a booster seat, without being anchored to the vehicle seat.

In the disclosed example, the seat shell 14 is an integral unitary one-piece shell construction. The seat shell 14 has a seating surface SS (see FIG. 3) defined in part by a front facing side 26 of the seat back portion 22 and in part by a top facing side 28 of the seat bottom portion 24. The seating surface SS is the surface that is configured and arranged to support a child seat occupant during use of the child restraint system 10. In normal use, the seat shell 14, or at least the seating surface SS would be covered by soft goods, as is known in the art. The soft goods are not shown herein so as to better illustrate aspects of the disclosed LATCH or anchoring components.

The disclosed seat shell 14 also has two side panels 30 that are positioned along the sides of the seat shell opposite and facing one another across the seating surface SS. The side panels 30 protrude forward and upward from the seat shell 14 relative to the seating surface SS. The side panels 30 can include one or more openings or other elements that help to define a belt routing path for the anchoring components, as described below. In this example, each side panel 30 has a first opening 32 positioned to coincide with or to be associated with the seat bottom portion 24 and a second opening 34 positioned to coincide with or to be associated with the seat back portion 22. These openings 32 and 34 are depicted clearly in FIGS. 1, 2A, and 3.

The anchoring components for the LATCH function include a track 36 provided on or disposed on the child restraint system 10 or the child safety seat 12. The construction of the track 36 can vary as will become evident to those having ordinary skill in the art upon reading this disclosure. The location of the track on the child restraint system or child safety seat can also vary.

In one example, the track 36 is defined in part by a bar 40 that is formed on, coupled to, attached to, fastened onto, or otherwise joined to the child restraint system 10. It is possible that the bar be attached to the seat base 12, but in the disclosed embodiments the bar 40 is provided on a surface of the seat shell 14. In this example, the bar 40 is fastened to one of the side panels 30 as depicted in FIGS. 1 and 2A-2C. The bar 40 can be secured to the seat shell 14 using conventional fasteners, one way fasteners, rivets, screws, or the like. In this example, the bar 40 has two opposed ends, each of which carries an end cap or connector 41a, 41b. Each end cap 41a, 41b is fastened to an outside surface 42 to the seat shell 14 using a screw 43. The end caps 41a, 41b can be molded plastic parts or can be formed of metal or other suitable materials. In this example, each end cap 41a, 41b has a bar opening 46 to receive an end of the bar 40 therein, as shown in FIGS. 2B and 2C. Each end cap 41a, 41b also has a fastener opening 47 formed therein through, the fastener opening being perpendicular or normal to the bar opening 46. Each end of the bar 40 also has a through-bore 48 formed through the bar. A mounting hole 49 is provided in the outside surface 42 of the seat shell side pane 30. The end caps 41a, 41b are mounted to the ends of the bar 40 with the bar ends received in the bar openings 46, as shown in FIGS. 2B and 2C. This aligns the fastener openings 47 in the end caps 41a, 41b with the through-bores 48. The screws 43 in this example extend through the fastener openings 47 and through-bores 48 and are screwed into the mounting holes 49 on the seat shell 14 to secure the bar 40 in place.

The bar 40 can be a solid rod formed of steel, aluminum, plastic, a composite material, a metal alloy, or any other suitably strong and rigid substrate. The bar 40 can also be linear, curved, continuously curved, partially linear, bent, or the like in order to follow the desired contour along the portion of the child restraint system 10 to which it is attached.

The track 36 on the child restraint system 10 has or defines a slot 44 along a portion of the child restraint system 10. In this example, the bar 40 is spaced from the outside surface 42 on the one side panel 30 of the seat shell 14. The space creates the slot 44 between the surface 42 and the bar 40, as best illustrated in FIG. 2B. The space or slot 44 has a slot length along the track 36 and a slot width that is defined by the size of the gap between the outside surface 42 and the bar 40. The slot width can be consistent over the length of the bar 40 or slot 44, or can vary along the track. If variable, the slot width may be defined by the largest portion of the gap or space. The slot 44 is closed at each end by a respective one of the end caps 41a, 41b on the bar 40 where the bar is attached to the child restraint system 10, i.e., to the seat shell 14 in this example.

The length of the slot 44 is determined by the distance between the two end caps 41a, 41b. The configuration and construction of the end caps can vary from the example shown and described herein.

The anchoring components of the disclosed system also include an anchor strap 50 as depicted in FIG. 1. The anchor strap 50 has a belt 52 with two anchoring connectors 54 that are carried by and coupled to the belt. The anchoring connectors 54 are spaced apart along the belt 52. Each of the anchoring connectors 54 can be carried on an end of the belt 52, as in this example. Alternatively, one of the anchoring connectors 54 can be carried on an end of the belt and a length adjuster can be carried on the other end. In this example, a length adjuster 56 is provided upstream of one of the anchoring connectors on the belt 52. The adjuster 56 can be provided to take up or let out slack in the belt 52 in order to tension the belt when securing the child restraint system 10 on the vehicle seat 18 or release tension in the belt to remove the child restraint system from the vehicle seat, as is known in the art. In this example, the belt has a central section 58 that is essentially defined between the anchoring connectors 54, or in this case the adjuster 56 and one of the connectors. The central section 58 of the belt has a thickness that is less that the slot dimension. When the child restraint system 10 is manufactured, or when the system is fully assembled, the central section 58 of the belt 52 is routed within the slot 44 and captured by the bar 40 to the seat shell 14 in this example.

The particular type of mechanical connector used for the anchoring connectors 54 can vary. The connectors shown in the drawings are representative of commonly used spring hooks that are found on many child restraint LATCH systems. The connectors can be safety spring hooks, carabiner hooks, spring snap hooks, or other types of clasps, latches, hooks, connectors, or the like. The anchoring connectors 54 must merely connect to the anchors or anchor points 20 on the vehicle seat 18. In most instances, the anchors or anchor points 20 are metal loops or rings fixed to a part of the vehicle or vehicle seat. Thus, these types of spring hooks are well suited for this purpose.

As shown in FIG. 1, the anchor strap 50 remains connected to the seat shell 14 at all times. Each of the two anchoring connectors 54 has a diameter or a portion with a circumferential size that that is larger than the slot width. This is so that the anchoring connectors 54 cannot fit through the slot 44. The size relationship prevents removal of the anchor strap 50 from the child safety seat 12 or in this example, the seat shell 14. The only way to remove the anchor strap would be to remove the bar 40, cut the belt 52, or detach one of the anchoring connectors 54 from the belt. Under normal use, the anchor strap 50 is thus permanently attached to the seat shell 14.

The first openings 32 in the side panels 30 of the seat shell define in part a first belt path for securing the child safety seat 12 in a rear facing direction. The second openings 24 in the side panels 30 define in part a second belt path for securing the child safety seat 12 in a forward facing direction. In the arrangement of FIG. 1, both of the anchoring connectors 54 and the entire belt 52 of the anchor strap 50 are positioned on the bar 40 side of the seat shell 14. In this arrangement, the anchor strap 50 can slide along the track 36 and the length of the slot 44. In this example, the anchor strap 50 can slide along the length of the bar 40 within the slot 44 between at least two anchoring positions. These positions can include a first or rear facing anchor position associated with and defined by the first openings 32 in the side panels. These positions can also include a second or forward facing anchor position associated with the second openings 34 in the side panels 30.

Figure 4:
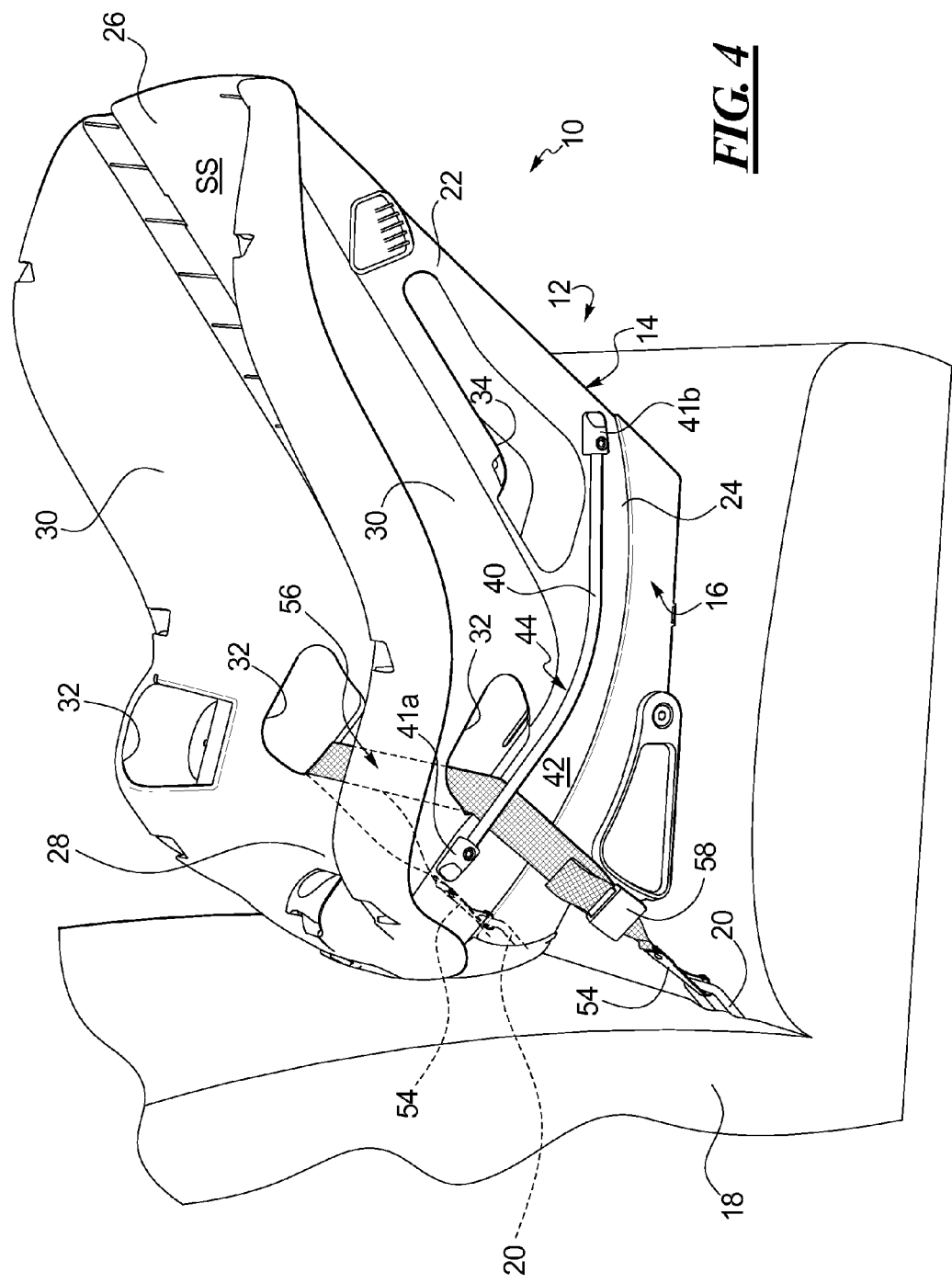
FIG. 4 shows the child restraint system of FIG. 1 anchored to the vehicle seat in a rear facing seat orientation and installation arrangement.

The child safety seat 12 can be positioned in a forward facing direction on the vehicle seat 18, as shown in FIGS. 1, 2A, and 3 or in a rear facing direction as shown in FIG. 4. For the forward facing direction, the anchor strap 50 can be slid to the second or forward facing anchor position that coincides with the second openings 34. One of the anchoring connectors 54 will stay on the bar 40 side of the seat shell 14 and can be clipped onto or otherwise connected to the adjacent anchor or anchor point 20 before threading the anchor strap 50 along the belt path. Alternatively, the connection can be made subsequent to threading the anchor strap 50 along the belt path. The other end of the anchor strap 50 and the corresponding anchoring connector 54 can be threaded through the near side opening 34, extended across a width of the seat shell 14, and then threaded through the other or far side opening 34 on the other side of the seat shell as shown in FIGS. 2A and 3. The anchoring connector 54 on the other end of the anchor strap 50 can then be clipped onto or otherwise connected to the other anchor or anchor point 20, as shown in FIG. 3. The belt 52 can be adjusted in length to a desired belt tension to secure the child safety seat 12 on the vehicle seat in the forward facing direction.

To release the child restraint system 10, the user can detach the anchoring connectors 54 and rethread the anchor strap 50 to the arrangement of FIG. 1. The child safety seat 12 can be repositioned in a rear facing orientation on the vehicle seat 18, as shown in FIG. 4. The anchor strap 50 can be slid to the first or rear facing anchor position that coincides with the first openings 32. One of the anchoring connectors 54 will again stay on the bar 40 side of the seat shell 14 and can be clipped onto or otherwise connected to the adjacent anchor or anchor point 20 before or after threading the anchor strap 50 along the belt path. The other end of the anchor strap 50 and the corresponding anchoring connector 54 can be threaded through the near side opening 32, extended across the width of the seat shell 14, and then threaded through the other or far side opening 32 on the other side of the seat shell. The anchoring connector 54 on the other end of the anchor strap 50 can then be clipped onto or otherwise connected to the other anchor or anchor point 20, as shown in FIG. 4. The belt 52 can again be adjusted in length to a desired belt tension to secure the child safety seat 12 on the vehicle seat 18 in the rear facing direction.

FIGS. 5A-8 depict another example of a child restraint system 60 that is constructed in accordance with the teachings of the present invention. In this example, the child restraint system 60 has a child safety seat 62 with a seat shell 64 and a seat base 66. The child safety seat 62 can be rested on the vehicle seat 18 for use. The vehicle seat 18 again has fixed anchors or anchor points 20 as required by the LATCH rules noted above.

Figure 5A:
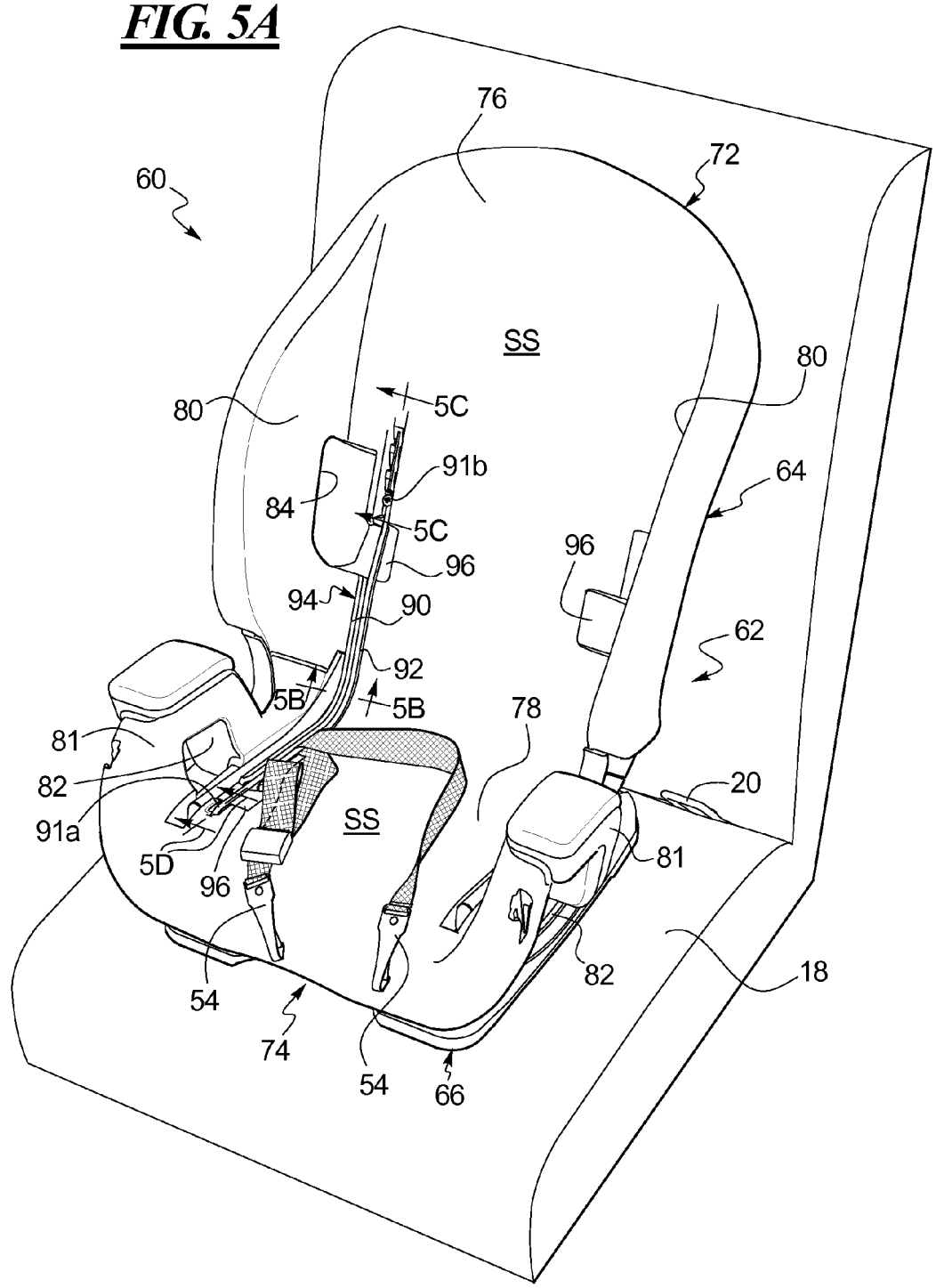
FIG. 5A shows a perspective view of another example of a child restraint system on a vehicle seat and constructed in accordance with the teachings of the present invention.
Figure 6:
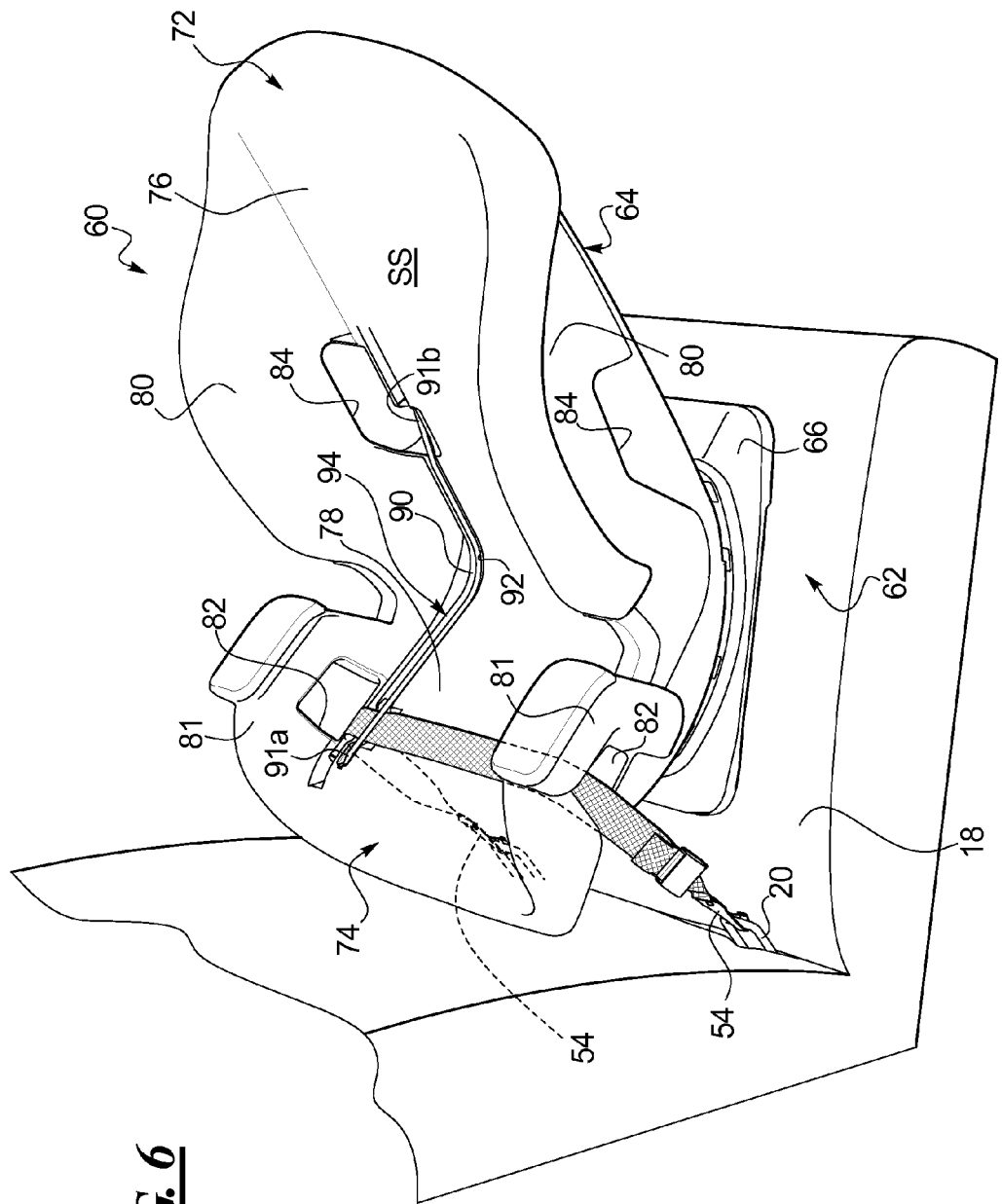
FIG. 6 shows the child restraint system of FIG. 5A anchored to the vehicle seat in a rear facing seat orientation and installation arrangement.
Figure 7:
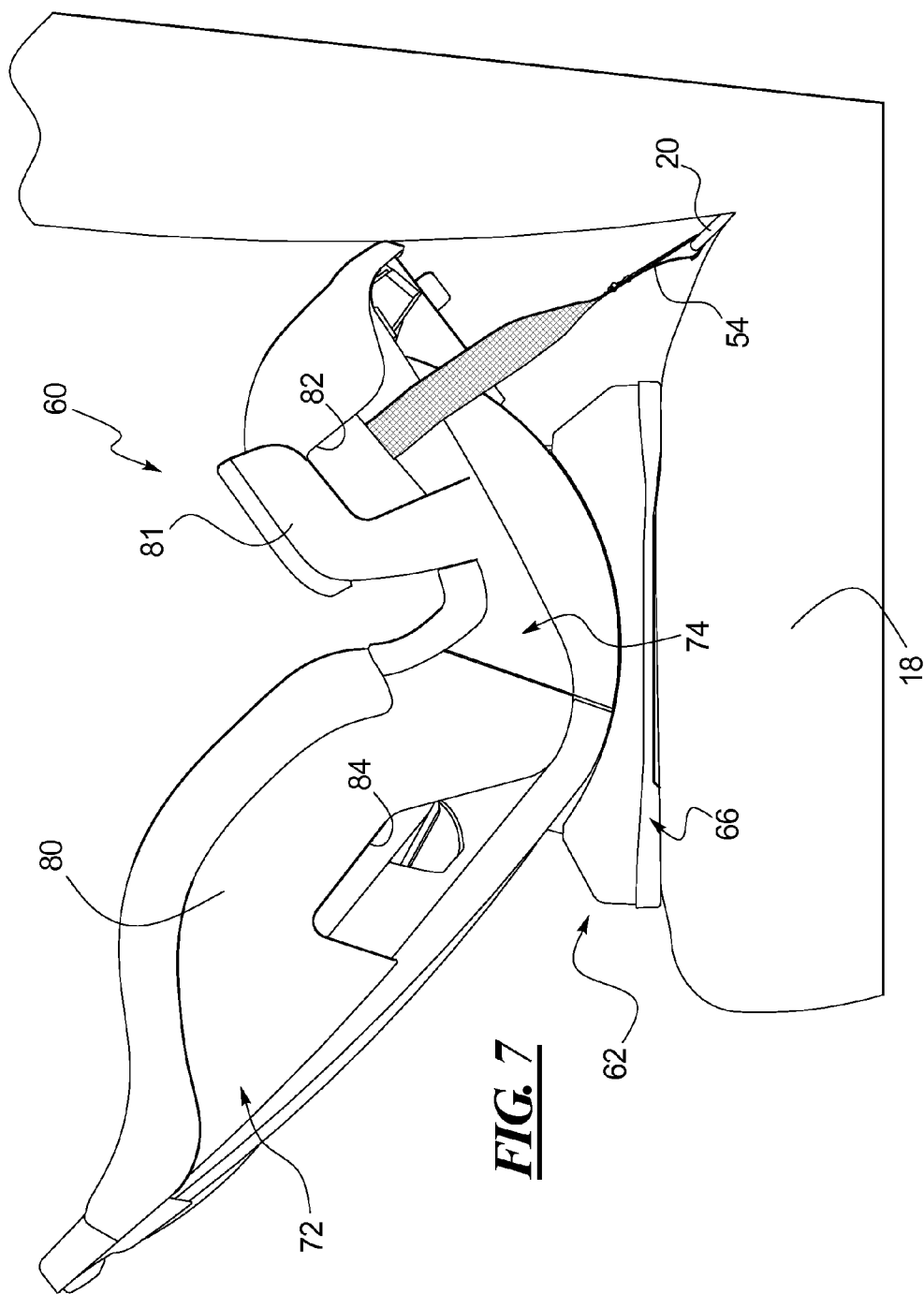
FIG. 7 shows a side view of the child restraint system in the rear facing seat orientation depicted in FIG. 6.

As shown in FIGS. 5A, 6, and 7, the disclosed seat shell 64 has a seat back portion 72 and a seat bottom portion 74. The seat shell 64 has a seating surface SS (see FIGS. 5A and 6) defined in part by a front facing side 76 of the seat back portion 72 and in part by a top facing side 78 of the seat bottom portion 74. The seat shell 64 in this example has two side wings 80 that are positioned along the sides of the seat back portion 74 of the seat shell opposite and facing one another across the seating surface SS. The seat shell 64 also has two arm rests 81 that are positioned along the sides of the seat bottom portion 72 of the seat shell opposite and facing one another across the seating surface SS. The side wings 80 protrude forward and the arm rests 81 protrude upward from the seat shell 64 relative to the seating surface SS. The side wings 80 and/or arm rests 81 can include one or more openings or other elements that help to define a belt routing path for the LATCH or anchoring components, as described below. In this example, each arm rest 81 has a first opening 82 positioned to coincide with or be associated with the seat bottom portion 74 and each side wing 80 has a second opening 84 positioned to coincide with or be associated with the seat back portion 72. These openings 82 and 84 are depicted clearly in FIGS. 5A, 6, and 7.

The anchoring components for the LATCH function in this example also include a track 86 again provided on or disposed on the child restraint system 60 or the child safety seat 62. The construction of the track 86 can vary as will become evident to those having ordinary skill in the art upon reading this disclosure. This is one example described herein to illustrate that the location of the track on the child restraint system or child safety seat can vary, as mentioned above.

Figure 5B:
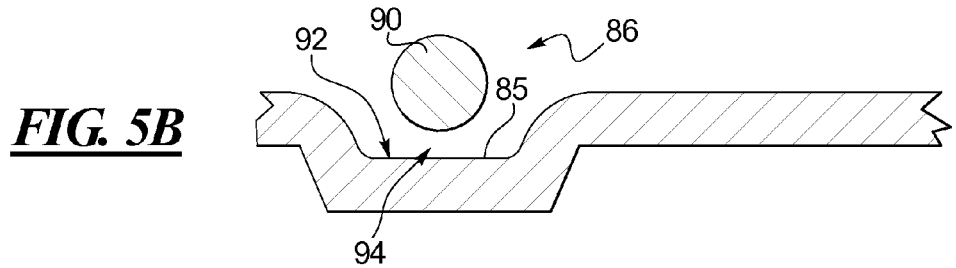
FIG. 5B shows a cross-section taken along line 5B-5B of a track portion of the child restraint system show in FIG. 5A.

In this example, the track 86 is defined in part by a bar 90 that is again coupled, attached, fastened, or otherwise joined to the child restraint system 60. In this example, the bar 90 is provided on the seating surface SS of the seat shell 64. The bar 90 is laterally offset toward and fastened to one side of the seating surface SS as depicted in FIGS. 5A and 6. The bar 90 can again be secured to the seat shell 64 using conventional fasteners, one way fasteners, rivets, screws, or the like, as discussed below. The track is also defined in part by a recess 92 that is formed along the seating surface SS in this example. The bar 90 is seated partly within or at least overlying or positioned along the recess 92, as best shown in FIGS. 5A and 5B. A surface 85 of the recess 92 partly surrounds or is adjacent, but is spaced from, the bar 90. The space between the bar 90 and the surface of the recess 92 creates a slot 94 around the bar. The space or slot 94 has a slot length along the length of the recess 92 and has a slot width that is defined by the size of the gap between the recess surface 85 and the bar 90. The slot width again can be consistent over the length of the bar 90, or can be variable. If variable, the slot width may be defined by the largest portion of the gap or space.

Figure 5C:
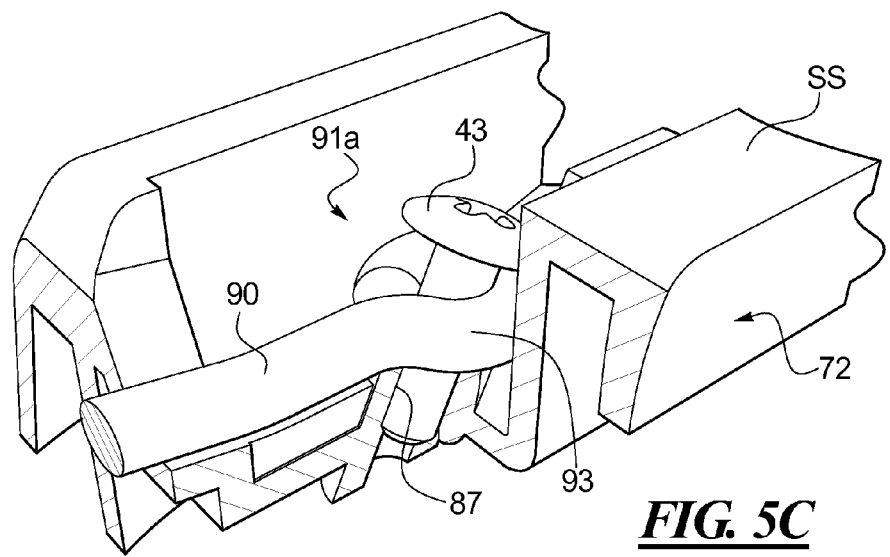
FIG. 5C shows a cross-section taken along line 5C-5C of an upper end of the track portion of the child restraint system shown in FIG. 5A.
Figure 5D:
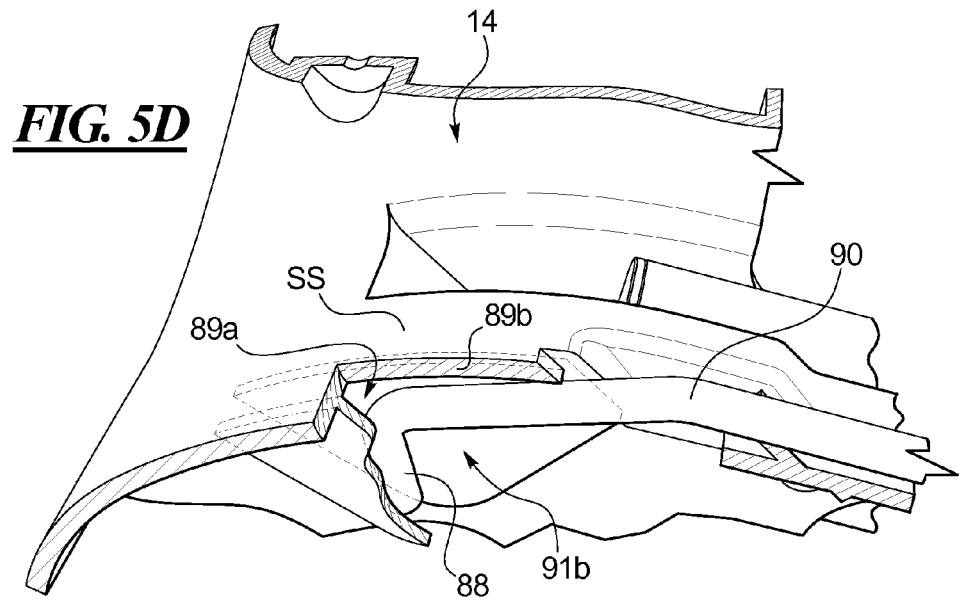
FIG. 5D shows a cross-section taken along line 5D-5D of a lower end of the track portion of the child restraint system shown in FIG. 5A.

In this example, the bar 90 has two opposed ends 91a, 91b, each of which has a different form in this example. FIG. 5C shows one end 91a, the upper end in this example. The one end 91a of the bar 90 is bent to form a loop 93 configured to receive a fastener, such as a screw 43, to fasten or otherwise connect the one end 91a to the seat shell 64. The seat shell 64 is provided with a bore 87 within the recess 92. The screw 43 can be screwed into the bore 87, which can be pre-formed with threads (not shown) or which can form threads in the bore 87 when screwed in. FIG. 5D shows the other end 91b of the bar 90, which is bent to form a leg or hook 88 oriented at an acute angle relative to the adjacent length of the bar 90. A hooded pocket 89a is provided at the corresponding end of the recess 92. The hook 88 is seated in the pocket 89a under a hood surface 89b, which retains the other end of the rod in place in this example. To install the rod 90, the other end 91b of the rod 90 can be inserted into the pocket 89a, directly or by turning or rotating the hook 88, to position the end under the hood surface 89b. The rod 90 can then be manipulated to align the loop 93 with the bore 87 and the screw 43 can be screwed into the bore to secure the rod 90 to the seating surface adjacent the recess 92.

The slot 94 is closed at each end 91a, 91b of the bar 90 where the bar is attached to the seating surface SS at the one end 91a and where the recess 92 terminates near the hooded pocket 89a at the other end 91b in this example. The length of the slot 94 is determined by the distance between the two closed ends. The bar 90 in this example is contoured to follow the curvature of the seating surface SS and recess 92.

The anchoring components of the disclosed system in this example also include the anchor strap 50 as depicted in FIG. 5. The anchor strap 50 is or can be identical to the strap described with respect to the example of FIGS. 1-4. In this example, the central section 58 of the belt 52 has a thickness that is less that the slot width of the slot 94 defined by the recess surface 85 and the bar 90. When the child restraint system 60 is manufactured, or when the system is fully assembled, the central section 58 of the belt 52 is routed within the slot 94 and captured by the bar 90 within the recess 92 on the seating surface SS of the seat shell 64.

As shown in FIG. 5A, the anchor strap 50 remains connected to the seat shell 64 at all times. Each of the two anchoring connectors 54 has a diameter or a portion with a circumferential size that that is larger than the slot dimension of the slot 94. This is so that the anchoring connectors cannot fit through the slot 94, which prevents removal of the anchor strap 50 from the child safety seat 62, or in this example, the seat shell 64. Again, the only way to remove the anchor strap 50 would be to remove the bar 90, cut the belt 52, or detach one of the anchoring connectors 54 from the belt. Under normal use, the anchor strap 50 is thus permanently attached to the seat shell 64.

The first openings 82 in the arm rests 81 define in part a first belt path for securing the child safety seat 62 in a rear facing direction. The second openings 84 in the side wings 80 define in part a second belt path for securing the child safety seat 62 in a forward facing direction. In the arrangement of FIG. 5A, both of the anchoring connectors 54 and the entire belt 52 of the anchor strap 50 are positioned on the seating surface SS on the seat shell 64. In this arrangement, the anchor strap 50 can slide along the bar 90 within the slot 94 of the recess 92 between at least two anchoring positions. These positions can include a first or rear facing anchor position associated with and defined by the first openings 82 in the arm rests. These positions can also include a second or forward facing anchor position associated with the second openings 84 in the side wings 80.

Figure 8:
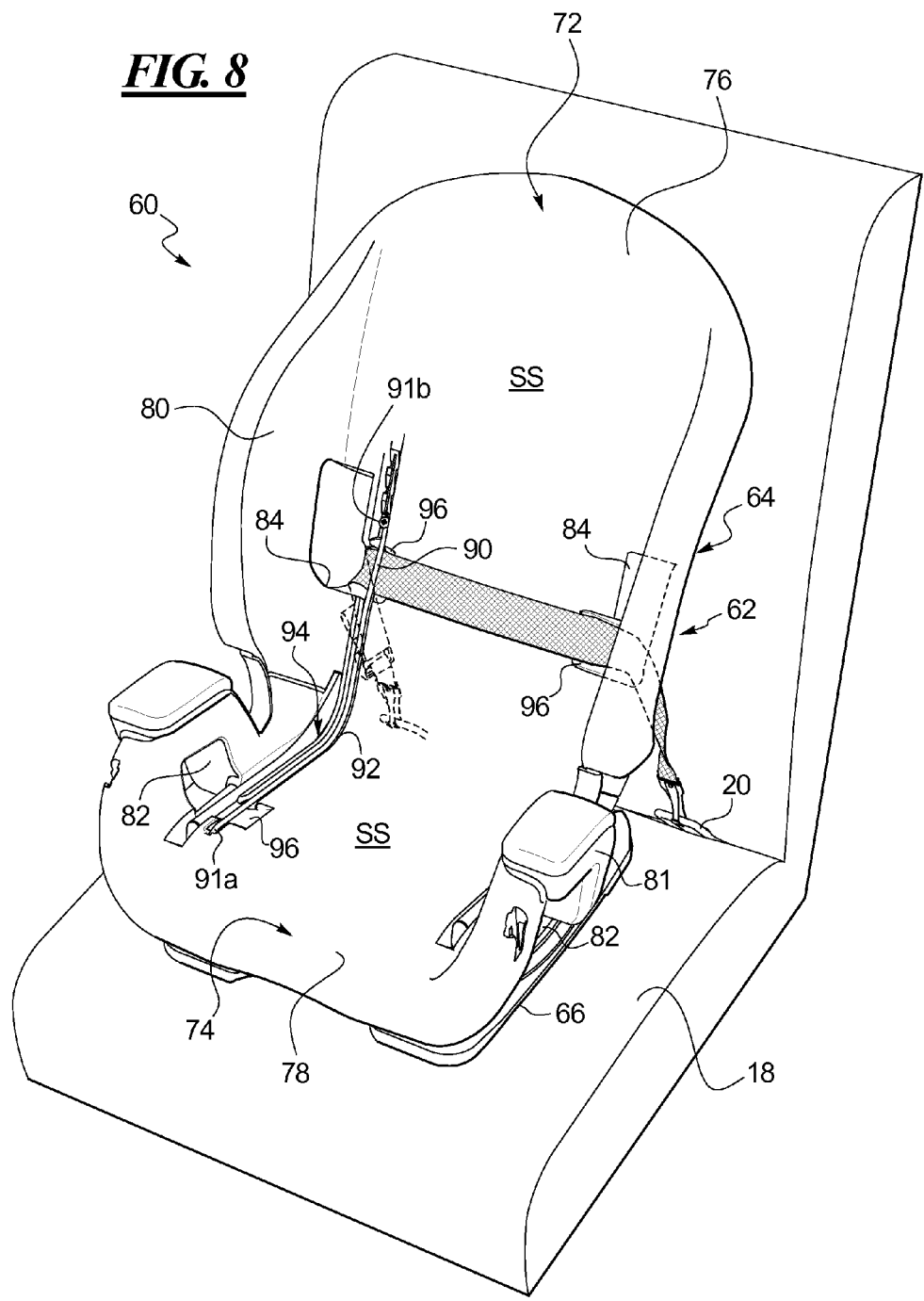
FIG. 8 shows the child restraint system of FIG. 5A anchored to the vehicle seat in a forward facing seat orientation and installation arrangement.

The child safety seat 62 can be positioned in a rear facing direction on the vehicle seat 18, as shown in FIGS. 6 and 7 or in a forward facing direction as shown in FIGS. 5A and 8. For the rear facing direction, the anchor strap 50 can be slid to the first or forward facing anchor position that coincides with the first openings 82. One of the anchoring connectors 54 will be threaded through one of the first openings 82 on one arm rest 81 of the seat shell 64 and can be clipped onto or otherwise connected to the adjacent anchor or anchor point 20. The other end of the anchor strap 50 and the corresponding anchoring connector 54 can be threaded through the other first opening 82, which extends the belt across a width of the seat shell 64, as shown in FIG. 6. The anchoring connector 54 on the other end of the anchor strap 50 can then be clipped onto or otherwise connected to the other anchor or anchor point 20, as shown in FIG. 7. The belt 52 can be adjusted in length to a desired belt tension to secure the child safety seat 62 on the vehicle seat 18 in the rear facing direction depicted in FIGS. 6 and 7.

To release the child restraint system 60, the user can detach the anchoring connectors 54 and rethread the anchor strap 50 to the arrangement of FIG. 5A. The child safety seat 62 can be repositioned in a forward facing orientation on the vehicle seat 18, as shown in FIG. 8. The anchor strap 50 can be slid to the second or forward facing anchor position that coincides with the second openings 84. One of the anchoring connectors 54 can be threaded through one of the second openings 84 and can be clipped onto or otherwise connected to the adjacent anchor or anchor point 20. The other end of the anchor strap 50 and the corresponding anchoring connector 54 can be threaded through the other second opening 84, extended the belt 52 across the width of the seat shell 64. The anchoring connector 54 on the other end of the anchor strap 50 can then be clipped onto or otherwise connected to the other anchor or anchor point 20, as shown in FIG. 8. The belt 52 can again be adjusted in length to a desired belt tension to secure the child safety seat 12 on the vehicle seat 18 in the forward facing direction.

As shown in FIGS. 5A and 6-8, the seating surface can be provided with scalloped areas 96 in the seating surface SS adjacent each of the belt path openings 82, 84. These scalloped areas can be provided in the seat shell 14 of the first described example as well. The scalloped areas can be positioned, sized, and contoured to provide visual and physical aid to the user for properly routing the anchor strap 50 in each of the anchor positions and belt paths. As will be evident to those having ordinary skill in the art, the openings, scalloped areas, and other features and elements of the child restraint systems 10 and 60 can be varied, added, and/or implemented while maintaining the overall function of the anchoring or LATCH assembly.

The disclosed CRS arrangement employs a single anchor strap for the LATCH assembly that can be moved to accommodate both forward facing and rear facing installation orientations while remaining permanently connected to the seat or shell of the CRS. The disclosed CRS thus has a single LATCH assembly to be used in both the rear and forward facing installations. The disclosed single LATCH design significantly reduces cost by completely eliminating the need for a second anchor strap or belt and its connectors or clips.

The disclosed child safety seats 12 and 62 would be covered at least in part by soft goods over the seating surface, though not shown herein. The disclosed CRS and LATCH solution has a benefit over the aforementioned Evenflo solution in that one does not have to remove soft goods from the CRS when routing the anchor strap through either of the belt paths. The disclosed LATCH design would also be less expensive and easier to install than the aforementioned Britax solution. The Britax solution requires two large diameter rigid bars or tubes separately attached to the seat shell, two separate straps, and two adjusters that are used to adjust the length of the webbing of each strap independently. With the disclosed LATCH design the user need only pull one strap to adjust the tension in the LATCH assembly. With the Britax solution the user must pull two straps independently to adjust the tension.

In the disclosed examples, a single bar is rigidly mounted to the shell or seat of the CRS to in part define a track on the CRS. The bar is spaced or offset slightly from a surface of the system, such as the shell, to provide clearance for the LATCH strap webbing. The anchor strap can slide freely along the length of the bar and can also slide freely across the seat shell relative to the bar. However, the anchor strap is retained captured to the shell by the bar because the anchoring connectors cannot fit between the bar and seat shell surface. In the above examples, the bars and slots gap define a track along which the single LATCH assembly anchor strap can transition or slide between the rear facing and forward facing anchor positions. The track could be formed by rigid metal or plastic parts, a flexible webbing, a wire, a rod or bar (as disclosed and described above), or a combination. The track could have any number of different optional cross-sectional shapes and configurations. The track can also vary in length to accommodate different belt path locations, CRS sizes, and the like. The term "bar" can be interpreted broadly herein as the element that creates the slide slot or track for movement of the anchor strap.

The bar or track could be an external bar or other structure placed at different locations and/or on different parts of the CRS, other than those disclosed and described above. The "bar" or track can be integrally molded into the CRS shell material with the strap inserted molded with the shell or force fit through the slot. Alternatively, the track can be created by a secondary part that is fixed to the shell, such as the aforementioned bars 40, 90.

The forward facing and rear facing belt paths across the width of the CRS can be separate from one another, as in the above disclosed example, requiring the webbing of the strap to be threaded through a given path when used and threaded back out of that path in order to be moved to the other path. Alternatively, clearance can be provided on the CRS between the forward and rear facing belt paths, creating one continuous opening between the two paths on the shell adjacent the rod or track. This would allow the strap to be moved from one belt path to the other without having to back the strap out of one belt path or anchoring position to be moved to the other belt path or anchoring position.

An optional sliding retainer can also be utilized, if desired. The optional retainer can be made of webbing, plastic, metal, or a combination and can be connected inside or to the track or bar. The LATCH assembly anchor strap can be coupled to the sliding retainer, which can translate between the different anchoring positions and belt paths inside or along the track or bar. Such a slidable retainer can be connected to the CRS and the strap can be connected to the slidable retainer.

Although certain child restraint systems, anchoring components, LATCH assembly components and features, and the like have been described herein in accordance with the teachings of the present disclosure, the scope of coverage of this patent is not limited thereto. On the contrary, this patent covers all embodiments of the teachings of the disclosure that fairly fall within the scope of permissible equivalents.

What is claimed is:
1. A child safety seat comprising:
   a seat shell having a seat back portion, a seat bottom portion, and a seating surface defined in part by a front facing side of the seat back portion and in part by a top facing side of the seat bottom portion, the seat shell being selectively anchorable on a vehicle seat within a vehicle in either one of a forward facing orientation and a rear facing orientation;
   a track provided on the child safety seat;
   a slot having a slot length along the track and a slot width defined between two parts of the track; and
   an anchor strap having a belt, two anchoring connectors coupled to and spaced apart along the belt, and a central section of the belt between the two anchoring connectors, the central section having a thickness less than the slot width and captured in the slot between the two parts of the track,
   wherein the two anchoring connectors are sized larger than the slot width thereby preventing removal of the anchor strap from the child safety seat,
   wherein the track includes a recess in the seating surface and a bar positioned within the recess and spaced from a surface of the recess, and
   wherein the anchor strap can slide along the slot length between at least a forward facing anchor position on the seat shell that corresponds to the forward facing orientation of the seat shell and a rear facing anchor position on the seat shell that corresponds to the rear facing orientation of the seat shell.

2. The child safety seat according to claim 1, wherein the length of the belt between the two anchoring connectors is adjustable by a user.

3. The child safety seat according to claim 1, wherein the bar is fastened to the seat shell, wherein the slot is defined between the surface of the recess and the bar.

4. The child safety seat according to claim 1, further comprising a forward facing belt path on the seat shell associated with the forward facing anchor position and a rear facing belt path on the seat shell associated with the rear facing anchor position, the forward facing belt path and rear facing belt path spaced apart from one another on the seat shell.

5. The child safety seat according to claim 1, wherein the seat shell has opposed side panels that protrude from opposite sides of the seating surface.

6. The child safety seat according to claim 5, further comprising one or more belt path openings formed in each of the side panels, the belt path openings defining in part the forward facing anchor position, the rear facing anchor position, or both.

7. The child safety seat according to claim 1, further comprising a seat base to which the seat shell can be removably mounted.

8. The child safety seat according to claim 1, wherein the seat back portion and the seat bottom portion are integrally formed together as a unit, which renders the seat shell a one-piece structure.

9. A child safety seat comprising:
a seat shell having a seat back portion, a seat bottom portion, and a seating surface defined in part by a front facing side of the seat back portion and in part by a top facing side of the seat bottom portion, the seat shell being selectively anchorable on a vehicle seat within a vehicle in either one of a forward facing orientation and a rear facing orientation;
a track provided on the child safety seat;
a slot having a slot length along the track and a slot width defined between two parts of the track; and
an anchor strap having a belt, two anchoring connectors coupled to and spaced apart along the belt, and a central section of the belt between the two anchoring connectors, the central section having a thickness less than the slot width and captured in the slot between the two parts of the track,
wherein the two anchoring connectors are sized larger than the slot width thereby preventing removal of the anchor strap from the child safety seat,
wherein the anchor strap can slide along the slot length between at least a forward facing anchor position on the seat shell that corresponds to the forward facing orientation of the seat shell and a rear facing anchor position on the seat shell that corresponds to the rear facing orientation of the seat shell, and
wherein the track includes a bar that is fastened to the seat shell, the bar being spaced from the seating surface of the seat shell and the slot being defined between a portion of the seating surface and the bar.

10. A child safety seat comprising:
a seat shell having a seat back portion, a seat bottom portion, and a seating surface defined in part by a front facing side of the seat back portion and in part by a top facing side of the seat bottom portion, the seat shell being selectively anchorable on a vehicle seat within a vehicle in either one of a forward facing orientation and a rear facing orientation;
a track provided on the child safety seat;
a slot having a slot length along the track and a slot width defined between two parts of the track; and
an anchor strap having a belt, two anchoring connectors coupled to and spaced apart along the belt, and a central section of the belt between the two anchoring connectors, the central section having a thickness less than the slot width and captured in the slot between the two parts of the track,
wherein the two anchoring connectors are sized larger than the slot width thereby preventing removal of the anchor strap from the child safety seat,
wherein the anchor strap can slide along the slot length between at least a forward facing anchor position on the seat shell that corresponds to the forward facing orientation of the seat shell and a rear facing anchor position on the seat shell that corresponds to the rear facing orientation of the seat shell, and
wherein the track includes a bar and the bar is attached to a portion of the seating surface of the seat shell.

11. A child restraint system comprising:
a seat base;
a seat shell removably supported on the seat base, the seat shell having a seat back and a seat bottom;
a track disposed on the child restraint system;
a slot defined by the track on the child restraint system, the slot having a slot length along the track and having a slot width defined by a spacing between parts of the track; and
an anchor strap having a belt, two anchoring connectors coupled to the belt, and a central section of the belt between the two anchoring connectors,
wherein the central section is captured in the slot and the anchor strap is extendable across a width of the child restraint system,
wherein the anchor strap can slide along the length of the slot between at least a forward facing anchor position on the child restraint system that corresponds to a forward facing orientation of the seat shell and a rear facing anchor position on the child restraint system that corresponds to a rear facing orientation of the seat shell,
wherein the seat shell has a seating surface defined in part by a front facing side of the seat back and a top facing side of the seat bottom, and wherein the track is provided along a portion of the seating surface, and
wherein the two anchoring connectors are sized larger than the slot width preventing removal of the anchor strap from the child restraint system.

12. The child restraint system according to claim 11, wherein the track includes a bar on the seating surface, the slot width defined between the bar and a surface along the portion of the seating surface.

13. The child restraint system according to claim 12, wherein the bar is attached to the seat shell within a recess in the seating surface.

14. The child restraint system according to claim 12, wherein the bar is curved or bent over at least a portion of a length of the bar.

15. The child restraint system according to claim 11, wherein a length of the central section of the belt is adjustable between the anchoring connectors.

16. The child restraint system according to claim 11, further comprising a forward facing belt path on the child restraint system associated with the forward facing anchor position and a rear facing belt path on the seat shell associated with the rear facing anchor position, the forward facing belt path and rear facing belt path being spaced apart from one another on the child restraint system.

17. The child restraint system according to claim 11, wherein the seat shell has opposed side panels that protrude from opposite sides of the seating surface.

18. The child restraint system according to claim 17, further comprising one or more belt path openings formed in each of the side panels, the belt path openings defining in part the forward facing anchor position, the rear facing anchor position, or both.

19. A child restraint system comprising:
a seat base;
a seat shell removably supported on the seat base, the seat shell having a seat back and a seat bottom;
a track disposed on the child restraint system;
a slot defined by the track on the child restraint system, the slot having a slot length along the track and having a slot width defined by a spacing between parts of the track; and
an anchor strap having a belt, two anchoring connectors coupled to the belt, and a central section of the belt between the two anchoring connectors,
wherein the central section is captured in the slot and the anchor strap is extendable across a width of the child restraint system,
wherein the anchor strap can slide along the length of the slot between at least a forward facing anchor position on the child restraint system that corresponds to a forward facing orientation of the seat shell and a rear facing anchor position on the child restraint system that corresponds to a rear facing orientation of the seat shell,
wherein the two anchoring connectors are sized larger than the slot width preventing removal of the anchor strap from the child restraint system,
wherein the track includes a bar on a part of the child restraint system, the slot width defined between the bar and a surface of the child restraint system, and
wherein the surface is on part of a seating surface defined in part by a front facing side of the seat back and a top facing side of the seat bottom, and wherein the bar is coupled to a portion of the seating surface.

20. The child restraint system according to claim 19, further comprising a recess in the seating surface, the surface being part of the recess.

* * * * *